United States Patent
Park et al.

(10) Patent No.: US 12,308,498 B2
(45) Date of Patent: May 20, 2025

(54) DURABLE MEMBRANE-ELECTRODE ASSEMBLY WITH HIGH IONIC CONDUCTIVITY AND METHOD OF MANUFACTURING SAME

(71) Applicants: Hyundai Motor Company, Seoul (KR); Kia Corporation, Seoul (KR); Industry Foundation of Chonnam National University, Gwangju (KR)

(72) Inventors: In Yu Park, Seoul (KR); Jong Kil Oh, Yongin-si (KR); Sun Ju Song, Seoul (KR); Jae Woon Hong, Gurye-gun (KR); Aniket Kumar, Gwangju (KR); Ye Jin Yun, Suncheon-si (KR)

(73) Assignees: HYUNDAI MOTOR COMPANY, Seoul (KR); KIA CORPORATION, Seoul (KR); INDUSTRY FOUNDAION OF CHONNAM NATIONAL UNIVERSITY, Gwangju (KR)

( * ) Notice: Subject to any disclaimer, the term of this patent is extended or adjusted under 35 U.S.C. 154(b) by 831 days.

(21) Appl. No.: 17/538,289

(22) Filed: Nov. 30, 2021

(65) Prior Publication Data
US 2022/0367893 A1 Nov. 17, 2022

(30) Foreign Application Priority Data
Apr. 30, 2021 (KR) .................. 10-2021-0056115

(51) Int. Cl.
*H01M 8/1004* (2016.01)
*C07F 9/00* (2006.01)

(52) U.S. Cl.
CPC .............. *H01M 8/1004* (2013.01); *C07F 9/00* (2013.01)

(58) Field of Classification Search
CPC .............. H01M 8/1004; H01M 8/1025; H01M 8/1027; H01M 8/1081; H01M 2008/1095; H01M 8/1032; H01M 8/1034; H01M 8/1041; H01M 8/1039; H01M 8/1058; C07F 9/00; Y02E 60/50; Y02P 70/50
See application file for complete search history.

(56) References Cited

U.S. PATENT DOCUMENTS

| | | | | |
|---|---|---|---|---|
| 2003/0175569 A1* | 9/2003 | Inagaki | ................. | H01M 4/926 429/480 |
| 2006/0280985 A1 | 12/2006 | Toyoda | | |
| 2009/0004528 A1* | 1/2009 | Fritsch | ............... | H01M 8/1025 429/494 |
| 2010/0159350 A1* | 6/2010 | Kurita | .................. | H01M 4/886 429/483 |

FOREIGN PATENT DOCUMENTS

| | | |
|---|---|---|
| EP | 1912272 A1 | 4/2008 |
| JP | 2006221974 A | 8/2006 |
| KR | 1020200035283 | 2/2020 |

OTHER PUBLICATIONS

Curtin et al., "Advanced materials for improved PEMFC performance and life", Journal of Power Sources 131:41-48 (2004).
Young et al., "Ionomer Degradation in Polymer Electrolyte Membrane Fuel Cells", Journal of the Electrochemical Society, 157(3):B425-B436 (2010).
Trogadas et al., "Degradation Mitigation in Polymer Electrolyte Membranes Using Cerium Oxide as a Regenerative Free-Radical Scavenger", Electrochemical and Solid-State Letters 11(7):B113-B116 (2008).
Uegaki et al., "Radical-induced degradation mechanism of perluorinated polymer electrolyte membrane", Journal of Power Sources 196:9856-9861 (2011).
Zhao et al., "Cesium substituted 12-tungstophosphoric (Csx-H3_xPW12O40) loaded on ceria-degradation mitigation in polymer electrolyte membranes", Journal of Power Sources 190:301-306 (2009).

* cited by examiner

*Primary Examiner* — Muhammad S Siddiquee
(74) *Attorney, Agent, or Firm* — MCDONNELL BOEHNEN HULBERT & BERGHOFF LLP (57) ABSTRACT

Disclosed are a membrane-electrode assembly (MEA) and a method of manufacturing the same. The MEA include an electrolyte membrane and a pair of electrodes, the electrodes being disposed on both surfaces of the electrolyte membrane, respectively. At least one of the electrolyte membranes and electrodes includes an ion-conducting polymer having a proton-conducting functional group, and a compound represented by Chemical Formula 1 is bonded to each of all or some of the proton-conducting functional groups:

MAx          [Chemical Formula 1]

wherein M is an element belonging to the lanthanum group, A is a hydrophilic functional group, and X is a numerical value for balance of charges between A and M. Since the MEA includes an ion-conducting polymer having good chemical durability and proton conductivity, the MEA is durable and has high proton conductivity.

6 Claims, 6 Drawing Sheets

DURABLE MEMBRANE-ELECTRODE ASSEMBLY WITH HIGH IONIC CONDUCTIVITY AND METHOD OF MANUFACTURING SAME

CROSS REFERENCE TO RELATED APPLICATIONS

The present application claims priority to Korean Patent Application No. 10-2021-0056115, filed Apr. 30, 2021, the entire contents of which is incorporated herein for all purposes by this reference.

TECHNICAL FIELD

The present disclosure relates to a membrane-electrode assembly (MEA) and a method of manufacturing the same, in which the MEA includes an ion-conducting polymer having good chemical durability and proton conductivity so that the MEA is durable and has high proton conductivity.

BACKGROUND

A polymer electrolyte membrane (PEMFC) fuel cell for automobiles is a generator that generates electricity by electrochemical reaction between hydrogen and oxygen originating in air and is well known as an eco-friendly next-generation energy source with high power generation efficiency and no emissions other than water. The PEMFC normally operates at a temperature of 95° C. or below and can give high power density. The reaction for electricity generation of the fuel cell occurs in a membrane-electrode assembly (MEA) composed of a perfluorinated sulfonic acid (PFSA) ionomer-based electrolyte membrane, an anode, and a cathode)).

Hydrogen supplied to the anode (oxidation electrode) of the fuel cell is split into protons (hydrogen ions) and electrons. The protons move toward the cathode (reaction electrode) through the membrane. The electrons move toward the cathode via an external circuit. Oxygen molecules, protons, and electrons react on the cathode to produce electricity and heat as main products and produce water as a reaction by-product.

Hydrogen and oxygen that are reaction gases for a fuel cell cross over through the electrolyte membrane to facilitate generation of hydrogen peroxide (HOOH). The hydrogen peroxide generates oxygen-containing radicals such as hydroxyl radicals (·OH) and hydroperoxyl radicals (·OOH). These radicals attack the perfluorinated sulfonic electrolyte membrane, causing the chemical degradation of the membrane and ultimately reducing the durability of the fuel cell (D. E. Curtin et al., J. Power Sources, 131, 41-48 (2004); A. P. Young et al., J. Electrochem. Soc., 157, B425-B436 (2010); P. Trogadas et al., Electrochem. Solid-State Lett., 11, B113-B116 (2008); R. Uegaki et al., J. Power Sources, 196, 9856-9861 (2011); D. Zhao et al., J. Power Sources, 190, 301-306 (2009))

Conventionally, to mitigate the chemical degradation of the electrolyte membrane and the membrane-electrode assembly, there was an approach to add various kinds of antioxidants to the electrolyte membrane.

Typically, cerium (III) nitrate hexahydrate was used as the antioxidant. In that case, cerium ions combine to the terminal of each sulfonic acid ($SO_3H$) group to cut off the path through which protons ($H^+$) can move. This increases the chemical durability of the electrolyte membrane but reduces proton conductivity of the electrolyte membrane.

SUMMARY

An objective of the present disclosure is to provide a membrane-electrode assembly (MEA) having higher chemical durability and proton conductivity than a conventional perfluorinated sulfonic acid ionomer-based electrolyte membrane such as Nafion™.

However, the objectives of the present disclosure are not limited the one described above. The objectives of the present disclosure will become more apparent from the following description and will be realized with components recited in the claims and combinations of the components.

One embodiment of the present disclosure provides a membrane-electrode assembly (MEA) including: an electrolyte membrane; and a pair of electrodes disposed on both sides of the electrolyte membrane, respectively, in which the electrolyte membrane, the electrodes, or both include an ion-conducing polymer with one or more proton-conducting functional groups, and all or some of the proton-conducting functional groups are combined with a compound represented by Chemical Formula 1.

MAx          [Chemical Formula 1]

where M is an element belonging to the lanthanum group, A is a hydrophilic functional group, and X is a numerical value for balance of charges between A and M.

The proton-conducting functional group may include a sulfonic acid group.

The ion-conducting polymer may be selected from the group consisting of a perfluorosulfonic acid, sulfonated poly(aryl ether ketone), sulfonated poly(arylene ether sulfone), and combinations thereof.

M may be cerium, and the hydrophilic functional group may be selected from the group consisting of sulfosuccinyl group, phosphate group, terephthalic group, and combinations thereof.

The ion-conducting polymer may include a carbon skeleton and a side chain represented by at least one of Structural Formulas 1 to 3 below:

[Structural Formula 1]

[Structural Formula 2]

[Structural Formula 3]

wherein * is an element in the carbon skeleton or the side chain bonded to sulfur (S).

The electrolyte membrane may include: a porous reinforcing layer impregnated with the ion-conducting polymer; and an ion transport layer provided on at least one surface of the reinforcing layer and including the ion-conducting polymer.

One embodiment of the present disclosure provides a method of manufacturing a membrane-electrode assembly, the method including: preparing a first solution containing a cerium precursor; preparing a second solution by adding the first solution to an ion-conducting polymer dispersion containing proton-conducting functional groups; obtaining a third solution by adding an acid solution to the second solution, and allowing reaction of the third solution such that cerium hydroxide ($Ce(OH)_3$) is bonded to each of all or part of the proton-conducing functional groups; obtaining a fourth solution by adding a precursor of a hydrophilic functional group to the resultant of the reaction of the third solution, and allowing reaction of the fourth solution such that the cerium hydroxide ($Ce(OH)_3$) changes into a hydrophilic functional group; preparing an electrolyte membrane by using the hydrophilic functional group; and forming electrodes on both surfaces of the electrolyte membrane, respectively.

The cerium precursor may be one selected from the group consisting of cerium isopropoxide ($Ce(OC_3H_7)_4$), cerium (III) acetate hydrate ($Ce(CH_3CO_2)_3 \cdot xH_2O$)), cerium (III) acetylacetonate hydrate ($Ce(C_5H_7O_2)_3 \cdot xH_2O$)), cerium (III) oxalate hydrate ($Ce_2(C_2O_4)_3 \cdot xH_2O$)), cerium trifluoromethanesulfonate ($Ce_n(CF_3SO_3) \cdot xH_2O$)), and any combination thereof.

The first solution may be prepared by dispersing the cerium precursor in a polar solvent selected from the group consisting of isopropanol, dimethylformamide, and combinations thereof.

The first solution may be prepared by adding the cerium precursor to a solvent and stirring the mixture for 10 to 600 minutes.

The content of the cerium precursor in the second solution may be 0.1% to 10% by weight based on the total amount of the ion-conducting polymer.

The third solution may be reacted under conditions of 40° C. to 150° C. and 1 hour to 24 hours.

The precursor of the hydrophilic functional group may include at least one selected from the group consisting of sulfosuccinic acid, phosphoric acid, terephthalic acid, and combinations thereof.

The content of the precursor of the hydrophilic functional group in the fourth solution may be 0.1% to 20% by weight based on the total amount of the ion-conducting polymer.

The fourth solution may be reacted under conditions of 40° C. to 150° C. and 1 hour to 24 hours.

The present disclosure can provide an electrolyte membrane having good chemical durability and proton conductivity, thereby considerably improving the durability and performance of a membrane-electrode assembly including the same.

In the electrolyte membrane according to the present disclosure, since the size of the path through which protons travel can be increased by the functional group linked to the end group of the side chain of the ion-conducting polymer, the proton conductivity of the membrane-electrode assembly is greatly improved.

In addition, according to the present disclosure, since cerium suppresses the chemical degradation of the electrolyte membrane, which is attributable to hydroxyl or hydroperoxyl radicals, the chemical durability of the membrane-electrode assembly is greatly improved.

However, the advantages of the present disclosure are not limited the ones described above. It should be understood that the advantages of the present disclosure include all effects that can be inferred from the description given below.

BRIEF DESCRIPTION OF THE DRAWINGS

The above and other objectives, features, and other advantages of the present disclosure will be more clearly understood from the following detailed description taken in conjunction with the accompanying drawings, in which.

DETAILED DESCRIPTION

The above objectives, other objectives, features, and advantages of the present disclosure will be readily understood from the following preferred embodiments associated with the accompanying drawings. However, the present disclosure is not limited to the embodiments described herein and may be embodied in other forms. The embodiments described herein are provided so that the disclosure can be made thorough and complete and that the spirit of the present disclosure can be fully conveyed to those skilled in the art.

Throughout the drawings, like elements are denoted by like reference numerals. In the accompanying drawings, the dimensions of the structures are larger than actual sizes for clarity of the present disclosure. Terms used in the specification, "first", "second", etc., may be used to describe various components, but the components are not to be construed as being limited to the terms. These terms are used only for the purpose of distinguishing a component from another component. For example, a first constitutive element may be referred as a second constitutive element, and the second constitutive element may be also referred to as the first constitutive element. As used herein, the singular forms "a", "an", and "the" are intended to include the plural forms as well unless the context clearly indicates otherwise.

It will be further understood that the terms "comprises", "includes", or "has" when used in this specification specify the presence of stated features, regions, integers, steps, operations, elements and/or components, but do not preclude the presence or addition of one or more other features, regions, integers, steps, operations, elements, components and/or combinations thereof. It will also be understood that when an element such as a layer, film, area, or sheet is referred to as being "on" another element, it can be directly on the other element, or intervening elements may be present therebetween. Similarly, when an element such as a layer, film, area, or sheet is referred to as being "under" another element, it can be directly under the other element, or intervening elements may be present therebetween.

Unless otherwise specified, all numbers, values, and/or representations that express the amounts of components, reaction conditions, polymer compositions, and mixtures used herein are to be taken as approximations including various uncertainties affecting measurement that inherently occur in obtaining these values, among others, and thus should be understood to be modified by the term "about" in all cases. Furthermore, when a numerical range is disclosed in this specification, the range is continuous, and includes all values from the minimum value of said range to the maximum value thereof, unless otherwise indicated. Moreover, when such a range pertains to integer values, all integers including the minimum value to the maximum value are included, unless otherwise indicated.

Figure 1:
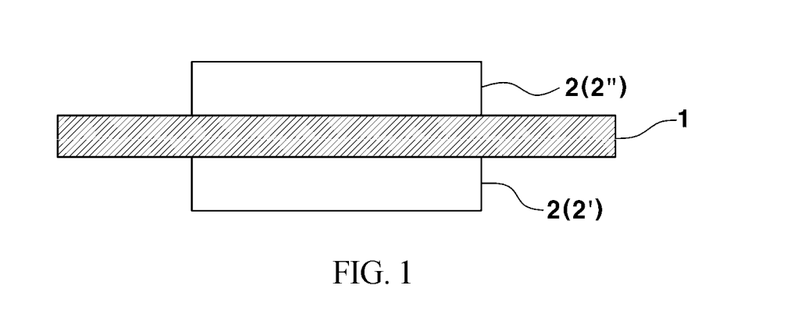
FIG. 1 is a cross-sectional view schematically illustrating a membrane-electrode assembly according to one embodiment of the present disclosure.

FIG. 1 is a cross-sectional view schematically illustrating a membrane-electrode assembly according to one embodiment of the present disclosure. Referring to FIG. 1, the membrane-electrode assembly includes an electrolyte membrane 1 and a pair of electrodes 2 provided on the respective surfaces of the electrolyte membrane 1. The pair of electrodes refers to an anode and a cathode. The anode and cathode are positioned to face the respective surfaces of the electrolyte membrane interposed therebetween.

Figure 2:
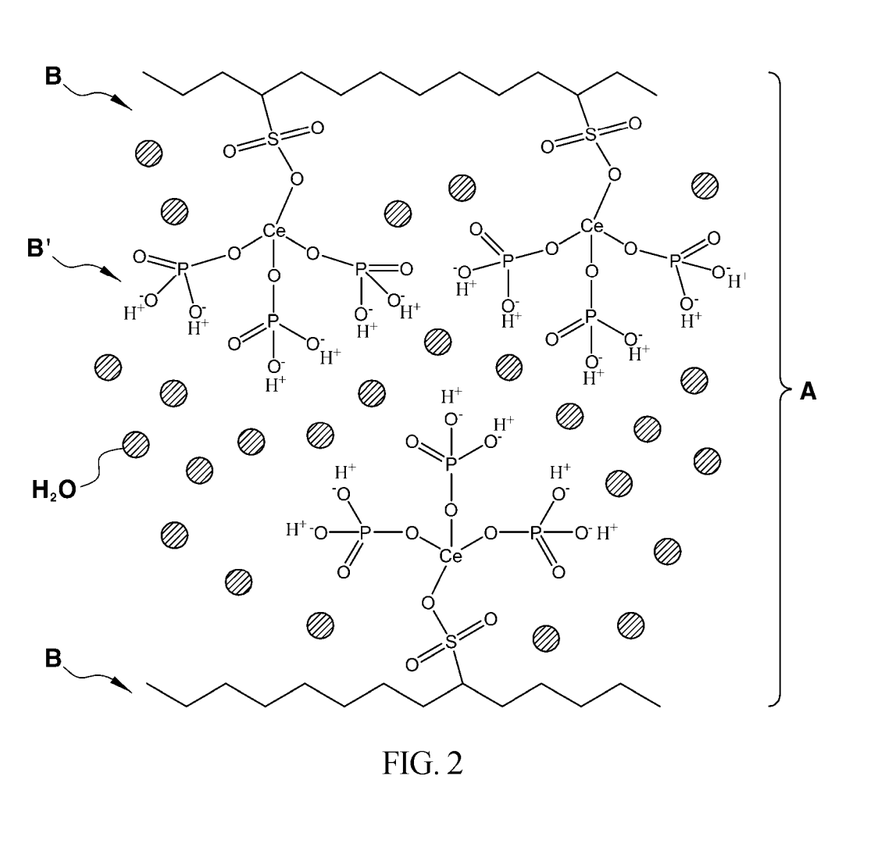
FIG. 2 is a schematic view illustrating a proton-conducting channel in an electrolyte membrane according to one embodiment of the present disclosure.

FIG. 2 is a schematic view illustrating a proton-conducting channel in the electrolyte membrane 1. The proton-conducting channel is formed by a main chain B forming an ion-conducting polymer and side chains B' arranged along the main chain B. Specifically, the electrolyte membrane 1 is impregnated with moisture ($H_2O$) via the functional group of the side chain B', and the proton-conducting chain A is formed.

Hereinafter, the ion-conducting polymer will be described in detail with reference to FIG. 2. FIG. 2 illustrates an example of the ion-conducting polymer, and the chemical structure of the ion-conducting polymer is not limited thereto.

The ion-conducting polymer is a polymer having proton conductivity. When being referred to as "having proton conductivity" means that the ion-conducting polymer has a proton-conducting functional group as a functional group in the main chain thereof.

The proton-conducting functional group may be a sulfonic acid group but is not limited thereto.

The ion-conducting polymer having a proton-conducting functional group may be one selected from the group consisting of a perfluorosulfonic acid, a sulfonated poly(aryl ether ketone), a sulfonated poly(arylene ether sulfone), and combinations thereof, but may not be limited thereto.

The ion-conducting polymer according to the present disclosure is characterized in that all or some of the proton-conducting functional groups are combined with a compound represented by Chemical Formula 1.

$$MAx \qquad \text{[Chemical Formula 1]}$$

M is an element belonging to the lanthanum group and is preferably cerium (Ce).

A is a hydrophilic functional group and is preferably one selected from the group consisting of a sulfosuccinyl group, a phosphate group, a terephthalic group, and any combination thereof.

X is a numeral value for balance of charges between A and M.

Specifically, the compound represented by Chemical Formula 1 is a compound represented by at least one of Structural Formulas 1 to 3:

[Structural Formula 1]

[Structural Formula 2]

[Structural Formula 3]

wherein * is an element in a carbon skeleton or an element in a side chain bonded to a sulfur element (S).

As the compound represented by Chemical Formula 1 is bonded to a proton-conducing group in the ion-conducting polymer, the proton-conducting channel A is extended. This enables water to easily travel, thereby significantly improving the proton conductivity of the electrolyte membrane 1.

In addition, the compound represented by Chemical Formula 1 contains cerium that is functionalized as a hydrophilic functional group, and the cerium inhibits a polymer electrolyte membrane from undergoing chemical degradation by hydroxyl or hydroperoxyl radicals, thereby significantly improving the chemical durability of the electrolyte membrane 1.

Figure 3:
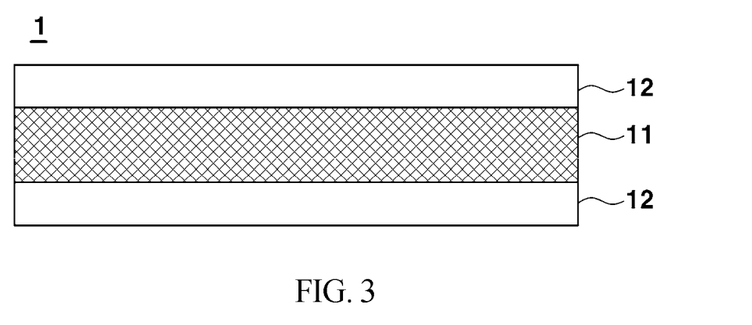
FIG. 3 is a cross-sectional view schematically illustrating an electrolyte membrane according to another embodiment of the present disclosure.

FIG. 3 is a cross-sectional view schematically illustrating an electrolyte membrane 1 according to another embodiment of the present disclosure. Referring to FIG. 3, the electrolyte membrane includes a porous reinforcing layer 11 and an ion transport layer 12 disposed on at least one surface of the reinforcing layer 11.

The reinforcing layer 11 is provided to increase the mechanical strength of the electrolyte membrane. The reinforcing layer 11 is made from one material selected from the group consisting of polytetrafluoroethylene (PTFE), extended polytetrafluoroethylene (e-PTfE), polyethylene (PE), polypropylene (PP), and polyphenylene oxide (PPO), polybenzimidazole (PBI), polyimide (PI), polyvinylidene fluoride (PVdF), polyvinyl chloride (PVC), and combinations thereof. The reinforcing layer 11 is a porous film having numerous pores.

The reinforcing layer 11 is a layer impregnated with the ion-conducting polymer. The ion transport layer 12 contains the ion-conducting polymer.

The electrodes 2 include an anode 2' configured to react with hydrogen gas and a cathode 2" configured to react with oxygen gas originating in the air.

The anode 2' splits hydrogen molecules into protons and electrons through hydrogen oxidation reaction (HOR). The protons pass through the electrolyte membrane 1 that is in contact with the anode 2' and move to the cathode 2". The electrons move to the cathode 2" via an external conductor (not illustrated).

The electrodes 2 contain catalyst such as platinum supported on carbon. In addition, the electrodes 2 may contain the ion-conducting polymer for proton conductivity therein. However, a different type of ionomer than the ion-conducting polymer may be contained.

Figure 4:
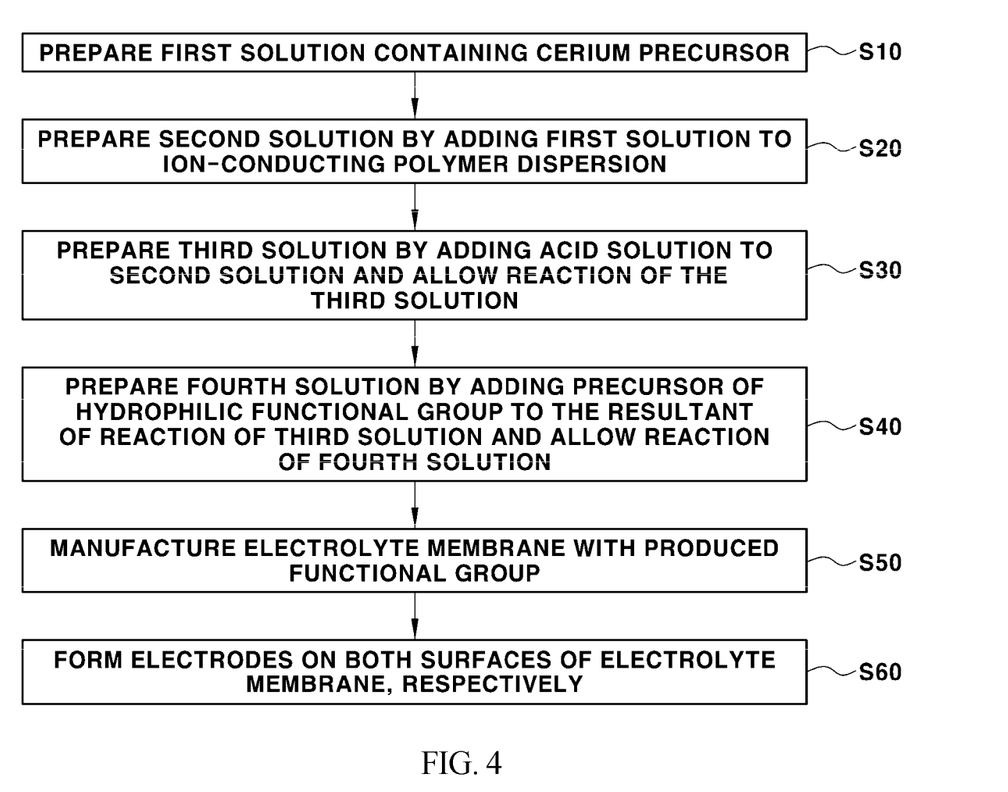
FIG. 4 is a flowchart illustrating a method of manufacturing a membrane-electrode assembly, according to one embodiment of the present disclosure.

FIG. 4 is a flowchart illustrating a method of manufacturing a membrane-electrode assembly, according to one embodiment of the present disclosure. Referring to FIG. 4, the manufacturing method includes: preparing a first solution containing a cerium precursor (S10); preparing a second solution by adding the first solution to an ion-conducting polymer dispersion containing proton-conducting functional groups (S20); obtaining a third solution by adding an acid solution to the second solution, and allowing reaction of the third solution such that cerium hydroxide (Ce(OH)$_3$) is bonded to each of all or part of the proton-conducing functional groups (S30); obtaining a fourth solution by adding a precursor of a hydrophilic functional group to the resultant of the reaction of the third solution reaction, and allowing reaction of the fourth solution such that the cerium hydroxide (Ce(OH)$_3$) changes into a hydrophilic functional group (S40); preparing an electrolyte membrane with the use of the hydrophilic functional group (S50); and forming electrodes on both surfaces of the electrolyte membrane, respectively (S60).

The first solution is prepared by dispersing the cerium precursor in a polar solvent (S10).

The cerium precursor may be one selected from the group consisting of cerium isopropoxide (Ce(OC$_3$H$_7$)$_4$), cerium (III) acetate hydrate (Ce(CH$_3$CO$_2$)$_3$·xH$_2$O)), cerium (III) acetylacetonate hydrate (Ce(C$_5$H$_7$O$_2$)$_3$·xH$_2$O)), cerium (DI) oxalate hydrate (Ce$_2$(C$_2$O$_4$)$_3$·xH$_2$O)), cerium trifluoromethanesulfonate (Cen(CF$_3$SO$_3$)·xH$_2$O)), and combinations thereof.

The polar solvent may be one selected from the group consisting of isopropanol, dimethylformamide, and combinations thereof. Preferably, a mixture of isopropanol and dimethylformamide is used as the polar solvent.

The first solution is prepared by adding the cerium precursor to a solvent and stirring the mixture for 10 to 300 minutes. Preferably, the stirring is carried out for 30 to 180 minutes. The dispersing technique is not limited to a specific method. For example, a magnetic bar may be used to stir the solution at a predetermined speed. However, when the stirring time is insufficient, the cerium precursors cannot be sufficiently dispersed. On the other hand, when it is excessively long, the processability will be deteriorated, and isopropanol which is a volatile alcohol will evaporate, resulting in the composition of the mixture differing from the originally designed composition.

The second solution can be prepared by adding the first solution to an ion-conducting polymer dispersion having a proton-conducting functional group (S20).

Since a description about the ion-conducting polymer containing the proton-conducting functional group is given above, a redundant description will be omitted here.

The second solution can be prepared by weighing each component so that the content of the cerium precursor is 0.1% to 10% by weight with respect to the total mass of the cerium precursor and the ion-conducting polymer. Preferably, the content of the cerium precursor may be 0.2% to 5% by weight with respect to the total mass of the cerium precursor and the ion-conducting polymer. Here, the content of the ion-conducting polymer refers to the content of a solid phase. When the content of the cerium precursor is lower than required, the improvement in the chemical durability and the effect of increasing proton conductivity are insignificant. On the other hand, when the cerium precursor is largely over-dosed, the mechanical strength of the electrolyte membrane is likely to be deteriorated and the dimensional stability of the electrolyte membrane is likely to be lowered due to excessive swelling.

The second solution can be prepared by mixing the first solution and the ion-conducting polymer dispersion and stirring the mixture for 10 to 300 minutes. When the stirring time is insufficient, the cerium precursor cannot be sufficiently dispersed. On the other hand, when it is excessively long, the processability will be deteriorated, and isopropanol which is a volatile alcohol will evaporate, resulting in the composition of the mixture from becoming far removed from the originally designed composition.

Next, an acid is added to the second solution to obtain the third solution, followed by reaction of the third solution such that cerium hydroxide derived from the cerium precursor is bonded to all or part of the proton-conducting functional group of the ion-conducting polymer.

Specifically, the third solution is obtained by adding deionized water or an acid solution to the second solution. The third solution is then heated to a predetermined temperature so that reaction can occur in the third solution. Through this reaction, the cerium precursor transforms into cerium hydroxide. The cerium hydroxide reacts to and combines with all or part of the proton-conducting functional groups of the ion-conducting polymer.

The acid solution is one selected from the group consisting of hydrochloric acid (HCl), sulfuric acid ($H_2SO_4$), nitric acid ($HNO_3$), phosphoric acid ($H_3PO_4$), iodide hydrogen (HI), and combinations thereof.

The reaction of the third solution is carried at a temperature in a range of 40° C. to 150° C., and preferably in a range of 60° C. to 100° C. When the reaction temperature is lower than required, the reaction occurs slowly, resulting in low reaction efficiency. On the other hand, when the reaction temperature is excessively high, the ion-conducting polymer will undergo thermal decomposition.

The reaction of the third solution is carried for 1 to 24 hours, and preferably for 2 to 12 hours. When the reaction time is shorter than required, the reaction cannot sufficiently occur, resulting in considerable reduction in reaction efficiency. On the other hand, when the reaction time is excessively long, processability will be deteriorated.

Next, a precursor of a hydrophilic functional group is added to the reaction product of the third solution to prepare the fourth solution, and the fourth solution undergoes reaction so that cerium hydroxide functions as a hydrophilic functional group (S40).

The precursor of the hydrophilic functional group may include at least one selected from the group consisting of a sulfosuccinic acid, a phosphoric acid, a terephthalic acid, and combinations thereof.

The reaction of the fourth solution is carried at a temperature in a range of 40° C. to 150° C., and preferably in a range of 60° C. to 100° C. When the reaction temperature is lower than required, the to reaction occurs slowly, resulting in low reaction efficiency. On the other hand, when the reaction temperature is excessively high, the ion-conducing polymer will undergo thermal decomposition.

The reaction of the fourth solution is carried for 1 to 24 hours, and preferably for 2 to 12 hours. When the reaction time is shorter than required, the reaction cannot sufficiently occur, resulting in considerable reduction in reaction efficiency. On the other hand, when the reaction time is excessively long, processability will be deteriorated.

The ion-conducting polymer contained in the resulting functional group may include a carbon skeleton and a side chain represented by at least one of Structural Formulas 1 to 3:

[Structural Formula 1]

[Structural Formula 2]

[Structural Formula 3]

wherein * is an element in a carbon skeleton or an element in a side chain bonded to a sulfur element (S).

Next, the reaction product is used to prepare an electrolyte membrane (S50). The method of preparing the electrolyte membrane from the reaction product is not particularly limited, and any of the usual methods may be used.

Two electrodes are attached to both surfaces of the electrolyte membrane, respectively, to obtain a membrane-electrode assembly (S60). The method of attaching the electrodes is not particularly limited, and any of the usual methods may be used.

Hereinbelow, the present disclosure will be described in more detail with reference to examples. However, the examples are presented only for illustrative purposes, and should not be interpreted to limit the scope of the present disclosure.

Examples 1 to 4

A first solution was prepared by adding and dispersing cerium isopropoxide, which is a cerium precursor, into a mixed solution of isopropanol and dimethylformamide.

A second solution was prepared by mixing the first solution and a perfluorinated sulfonic acid dispersion. The content of the cerium isopropoxide with respect to the total amount of a perfluorosulfonic acid prepared as a solid phase was 0.625% by weight in Example 1, 1.25% by weight in Example 2, 1.875% by weight in Example 3, and 2.5% by weight in Example 4. The second solution was stirred at room temperature (approximately 25° C.) for approximately 2 hours.

Distilled water and hydrochloric acid were added to the second solution to obtain a third solution. The third solution undergoes sufficient reaction at about 80° C. for about 12 hours so that cerium hydroxide was bonded to proton-conducting functional groups of the perfluorosulfonic acid.

Phosphoric acid which is a precursor of a hydrophilic functional group was added to the reaction product of the third solution to produce a fourth solution. The content of the phosphoric acid was 4% by weight in Example 1, 8% by weight in Example 2, 12% by weight in Example 3, and 16% by weight in Example 4, with respect to the total amount of the perfluorinated sulfonic acid (solid phase). The content of the phosphoric acid was increased in the same ratio as the content of the cerium isopropoxide.

The fourth solution underwent sufficient reaction at about 80° C. for about 12 hours so that cerium hydroxide turned into hydrophilic functional groups.

The reaction product was applied onto a substrate and dried to produce an electrolyte membrane.

COMPARATIVE EXAMPLE

The perfluorosulfonic acid dispersion was applied onto a substrate and dried to produce an electrolyte membrane.

Test Example 1

Fluorine ions released from each of the electrolyte membranes prepared according to Examples 1 to 4 and the Comparative Example were measured over time. The results are shown in FIG. 5.

Figure 5:
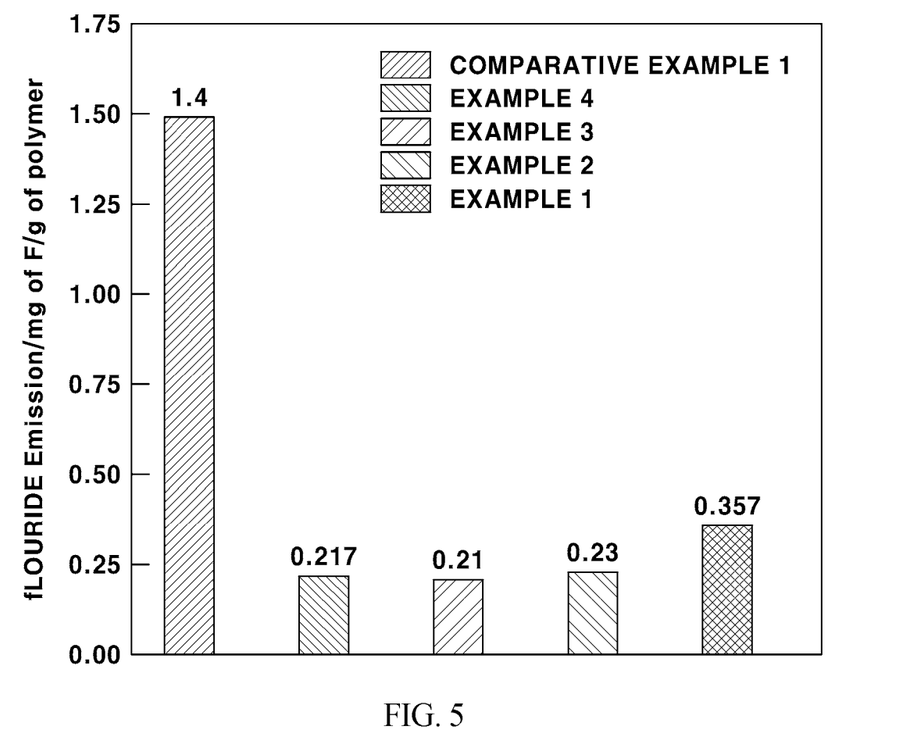
FIG. 5 is a graph illustrating fluorine disclosure emissions from electrolyte membranes, over time, according to Examples 1 to 4 and Comparative Example.

Referring to FIG. 5, it is seen that the fluorine ion emissions in Examples are significantly lower than that in Comparative Example. This means that the chemical durability of the electrolyte films of the Examples is much better than that of the Comparative Example.

Test Example 2

Proton conductivity of each of the electrolyte membranes of Examples 1 and 2 and the Comparative Example was measured. The proton conductivity was measured at a temperature in a range of 40° C. to 90° C. at a relative humidity of 100%. The results are shown in FIG. 6.

Figure 6:
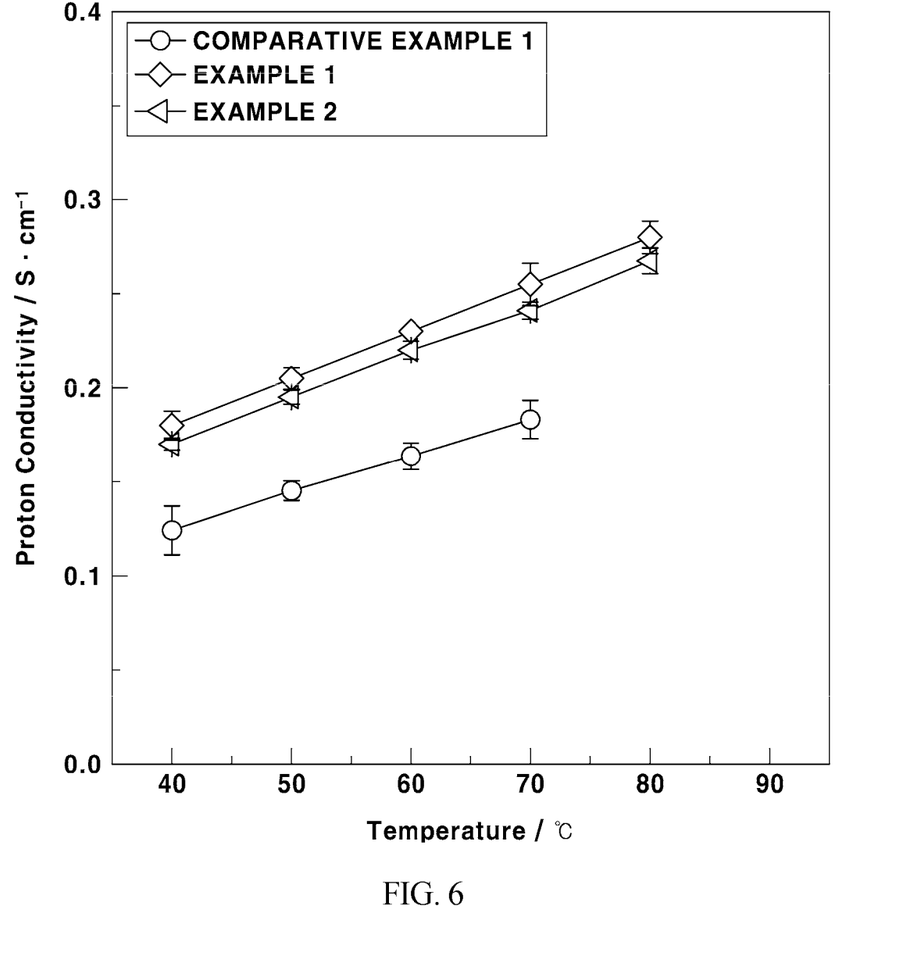
FIG. 6 is a graph illustrating proton conductivity of each of the electrolyte membranes according to Examples 1 to 4 and Comparative Example, respectively.

With reference to FIG. 6, the electrolyte membranes of Example 1 and Example 2 exhibit higher proton conductivity than that of the Comparative Example, at all temperatures at which the measurement was carried out.

Although examples and test examples according to the present disclosure have been described for illustrative purposes, those skilled in the art will appreciate that various modifications, additions, and substitutions are possible, without departing from the scope and spirit of the disclosure as disclosed in the appended claims.

What is claimed is:

1. A membrane-electrode assembly comprising:
an electrolyte membrane; and
a pair of electrodes, the electrodes being disposed on both surfaces of the electrolyte membrane, respectively,
wherein at least one of the electrolyte membranes and electrodes comprises an ion-conducting polymer having a proton-conducting functional group, and
a compound represented by Chemical Formula 1 is bonded to each of all or some of the proton-conducting functional groups:

$$MAx \quad \text{[Chemical Formula 1]}$$

wherein M is an element belonging to the lanthanum group, A is a hydrophilic functional group, and X is a numerical value for balance of charges between A and M.

2. The membrane-electrode assembly according to claim 1, wherein the proton-conducting functional group comprises a sulfonic acid group.

3. The membrane-electrode assembly according to claim 1, wherein the ion-conducting polymer is selected from the group consisting of perfluorosulfonic acid, sulfonated poly (aryl ether ketone), sulfonated poly(arylene ether sulfone), and combinations thereof.

4. The membrane-electrode assembly according to claim 1, wherein M is cerium, and
the hydrophilic functional group is selected from the group consisting of a sulfosuccinyl group, a phosphate group, a terephthalic group, and combinations thereof.

5. The membrane-electrode assembly according to claim 1, wherein the ion-conducting polymer comprises a carbon skeleton and a side chain represented by at least one of Structural Formulas 1 to 3:

[Structural Formula 1]

[Structural Formula 2]

-continued

[Structural Formula 3]

wherein * is an element included in the carbon skeleton or an element included in the side chain bonded to sulfur (S).

6. The membrane-electrode assembly according to claim 1, wherein the electrolyte membrane comprises a porous reinforcing layer impregnated with the ion-conducting polymer and an ion transport layer provided on at least one surface of the reinforcing layer and including the ion-conducting polymer.

* * * * *